United States Patent [19]
Beckman et al.

[11] Patent Number: 5,487,371
[45] Date of Patent: Jan. 30, 1996

[54] AIR-OIL SEPARATOR UTILIZING CENTRIFUGAL SEPARATION

[75] Inventors: Kurt D. Beckman, Chillicothe; Beth A. Hinchee, Murphysboro, both of Ill.

[73] Assignee: Caterpillar Inc., Peoria, Ill.

[21] Appl. No.: 363,782

[22] Filed: Dec. 27, 1994

[51] Int. Cl.⁶ .............................. F02B 47/08; F02M 25/06
[52] U.S. Cl. ........................................................ 123/572
[58] Field of Search ................................... 123/572, 573

[56] References Cited

U.S. PATENT DOCUMENTS

| | | | |
|---|---|---|---|
| 2,291,879 | 8/1942 | Chandler et al. | 123/572 |
| 3,158,142 | 11/1964 | Bradshaw | 123/572 |
| 3,380,441 | 4/1968 | Lewis | 123/572 |
| 4,184,858 | 1/1980 | Walker | 55/228 |
| 4,269,607 | 5/1981 | Walker | 55/1 |
| 4,270,508 | 6/1981 | Lindberg | 123/572 |
| 4,459,966 | 7/1984 | Sakano et al. | 123/573 |
| 4,501,234 | 2/1985 | Toki et al. | 123/41.86 |
| 4,721,090 | 1/1988 | Kato | 123/572 |
| 4,724,807 | 2/1988 | Walker | 123/196 A |
| 4,930,456 | 6/1990 | Schiavi | 123/572 |
| 5,140,957 | 8/1992 | Walker | 123/198 E |

Primary Examiner—David A. Okonsky
Attorney, Agent, or Firm—Charlton

[57] ABSTRACT

The design and construction of past air-oil separators included labyrinth type designs with a series of baffles which can be expensive and complicated to manufacture. The present invention utilizes an air-oil separator which allows the introduction of blow-by gas to high velocity fresh air at its boundary layer in order to separate oil and air from the blow-by gas. The air-oil separator has an annular housing with first and second compartments. The blow-by gas enters a constricted middle portion of the first compartment through a plurality of openings. Simultaneously, fresh air at a high velocity flows through the constricted middle portion. The blow-by gas is accelerated with the fresh air flow at the boundary layer of the fresh air. The fresh air flow and blow-by gas reach an annular opening in the second compartment which strips the boundary layer from the fresh air flow causing the blow-by gas to split off into an annular outer gallery at a high velocity. The outer gallery has an annular wall with a surface curving away from the fresh air flow path which promotes a centrifugal action causing the oil particles within the blow-by gas to collide with and collect on the wall surface. The oil, now removed from the blow-by gas, drains from the outer gallery into the oil pan. The fresh air and remaining air from the blow-by gas are carried toward the combustion chamber. Boundary layer fluid flow and centrifugal Separation are utilized in this simple and efficient method of air-oil separation.

12 Claims, 3 Drawing Sheets

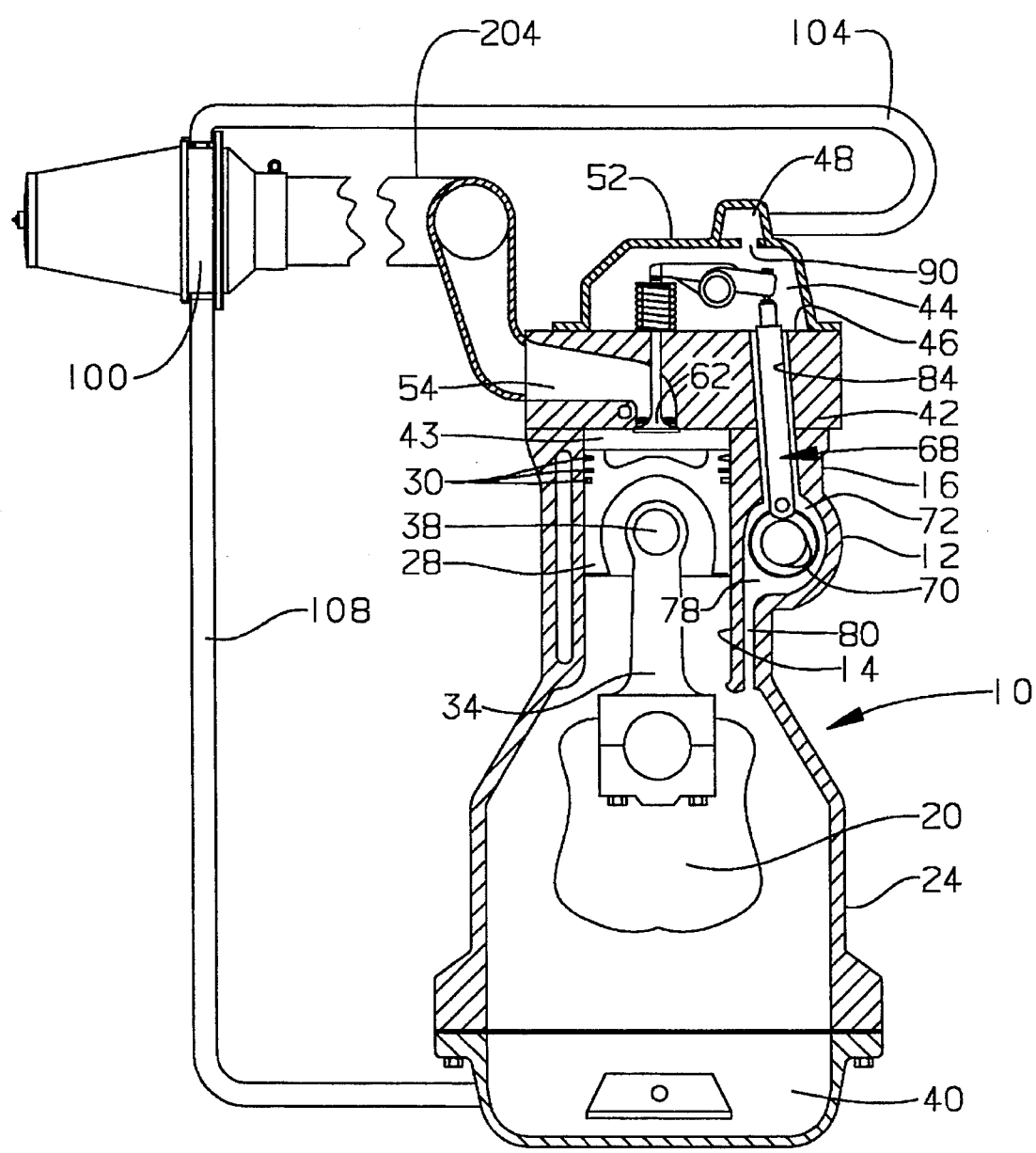

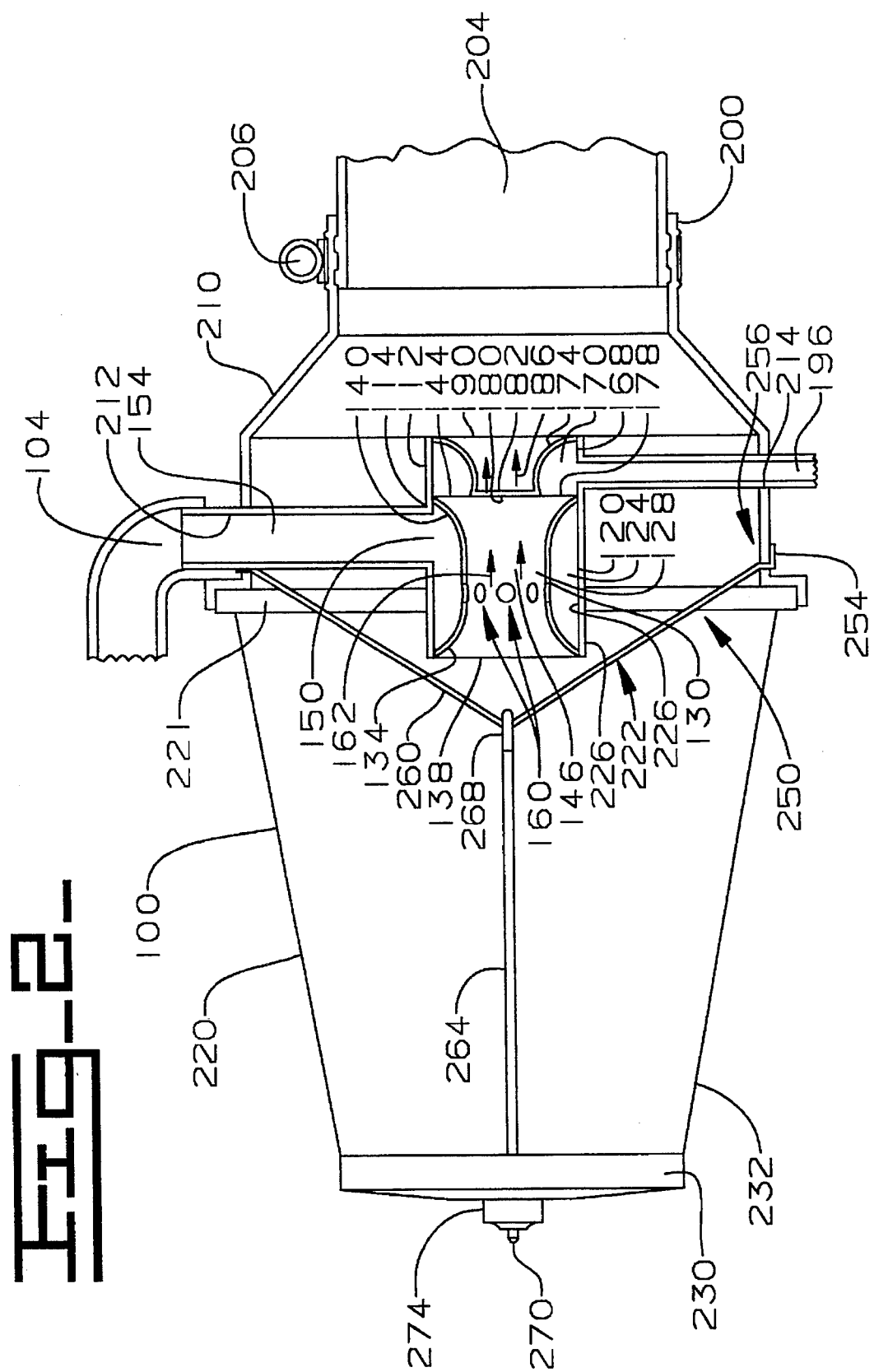
Fig_2_

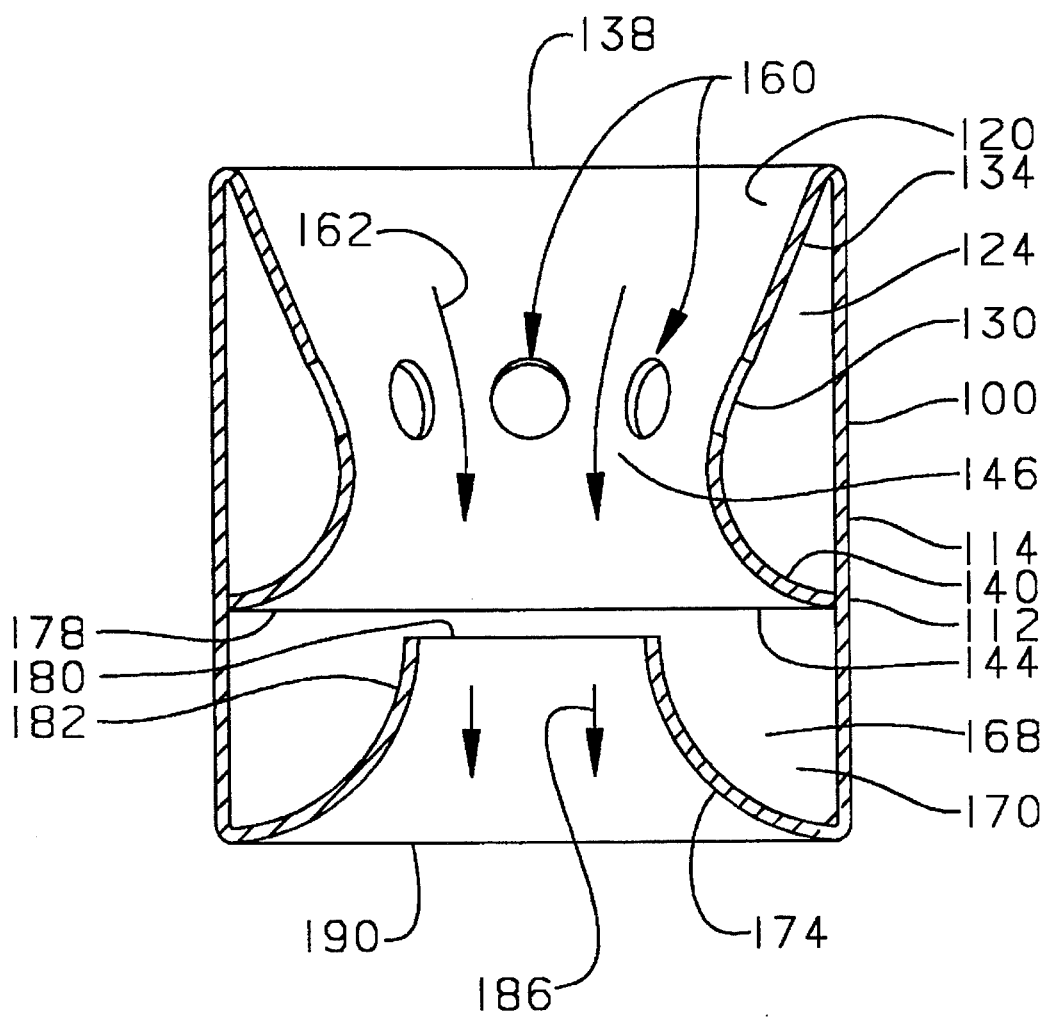

1

AIR-OIL SEPARATOR UTILIZING CENTRIFUGAL SEPARATION

TECHNICAL FIELD

This invention relates generally to an air-oil separator for use with an internal combustion engine and more particularly to the utilization of high velocity fresh air to produce a centrifugal force when mixed with engine blow-by gas for enhanced separation.

BACKGROUND ART

Once an air-fuel mixture has been drawn into the combustion chamber of an internal combustion engine, the mixture is ignited and is burned until it is discharged to the atmosphere. However, not all of the air-fuel mixture is completely burned and discharged. A portion of the unburned mixture during the compression stroke and a portion of the burnt gas during the power stroke leaks through the clearance space between the piston and the cylinder wall into the crankcase. The leaked gas is commonly referred to as blow-by gas. The blow-by gas needs to be discharged outside of the engine partly because it deteriorates the quality of the lubricating oil in the crankcase and partly because the leak pressure tends to increase the pressure in the crankcase. Excessive pressure in the crankcase may cause leaking of the lubricating oil and the back flow of the lubricating oil into the cylinder head. Therefore, a means is needed to remove blow-by gas from the crankcase. Normally, the blow-by gas is returned to the combustion chamber instead of direct injection into the atmosphere in order to avoid air pollution concerns. The blow-by gas is directed through an air-oil separator before entering the combustion chamber so that lubricating oil may be separated from the air before combustion.

Prior art air-oil separators have utilized labyrinth type designs which allow the oil to collect on the walls of a housing through a series of baffles. The oil drains downwardly to a lowermost point on the separator and is directed to the crankcase through an opening. Consequently, the air is separated from the oil and is continuously directed inward during the oil removal process. The resultant "separated" air is mixed with fresh air entering through the air filter for use within the combustion chamber. The labyrinth designs rely totally on the baffles to remove the oil from the air and can be expensive and complicated to manufacture.

Prior art air-oil separators typically use a spring pull-through device for attaching the air filter housing to the air-oil separator. The spring pull-through device is easily twisted and distorted during installation and subsequent maintenance procedures.

The present invention is directed at overcoming the problems as set forth above.

DISCLOSURE OF THE INVENTION

In one aspect of the present invention, an air-oil separator comprises a housing with an outer wall. A first compartment is located within the housing. The first compartment has an outer annular chamber, an inner chamber in communication with the outer chamber, and a central annular wall separating the outer chamber from the inner chamber. The central wall has a first end port:ion diverging toward the outer wall to define a first fluid inlet port and a second end portion opposite the first end portion diverging toward the outer wall to define a fluid outlet port. A second fluid inlet port extends from the outer chamber through the outer wall of the housing. A second compartment is located within the housing and is adjacent the first compartment.

In another aspect of the present invention, an internal combustion engine has a cylinder block which defines a crankcase portion with blow-by gas therein. A piston is reciprocally disposed within a bore in the cylinder block. A cylinder head is in closing relation with the bore in the cylinder block and forms a variable volume combustion chamber with the piston. A passage is defined within the crankcase portion in communication with the combustion chamber. An air-oil separator is disposed between the crankcase portion and the combustion chamber. The invention comprises a housing having an outer wall. A source of high velocity fresh air is included. A first compartment is located within the housing. The first compartment has an outer annular chamber, an inner chamber in communication with the outer chamber, and a central annular wall separating the outer chamber from the inner chamber. The central wall has a first end portion diverging toward the outer wall to define a first fluid inlet port for receiving fresh air and a second end portion opposite the first end portion diverging toward the outer wall to define a fluid outlet port. A second fluid inlet port for receiving blow-by gas extends from the outer chamber through the outer wall of the housing. A central flow path is defined between the first fluid inlet port and the fluid outlet port. A second compartment is adjacent the first compartment and in communication with the central flow path. Means are disposed within the first compartment for introducing the blow-by gas to the fresh air. Means are disposed within the second compartment for separating liquid from the blow-by gas.

The present invention utilizes a first compartment with a means for introducing blow-by gas from the crankcase to high velocity fresh air and, then, separating the liquid portion from the blow-by gas therein. The high velocity of the fresh air during introduction and the unique design of the second compartment promote separation of the liquid from the blow-by gas in this simple and efficient method of air-oil separation.

BRIEF DESCRIPTION OF THE DRAWINGS

FIG. 1 is an elevational end view in section of an internal combustion engine embodying the present invention;

FIG. 2 is an elevational front view in section of an air-oil separator according to the present invention; and FIG. 3 is a partially sectioned perspective view of a portion of the air-oil separator according to the present invention.

BEST MODE FOR CARRYING OUT THE INVENTION

Referring now to the drawings and in particular FIGS. 1 and 2, an internal combustion engine 10 includes a cylinder block 12 with an annular open ended bore 14 at an upper end 16. A crankshaft 20 is rotatably mounted within the cylinder block 12 at a lowermost end 24. The lowermost end 24 being commonly referred to as the crankcase portion of the cylinder block 12. It should be understood that in further references the lowermost end 24 of the cylinder block 12 and the crankcase may be interchanged. A piston 28 is mounted within the bore 14 and is sealed against the wall of the bore 14 by a plurality of piston rings 30. The piston 28 is connected to the crankshaft 20 through any type of suitable means capable of providing reciprocating, linear movement, such as a conventional connecting rod 34 and piston pin 38 or any other linkage. The piston 28 reciprocates between a top dead center (TDC) position at an uppermost location and a bottom dead center (BDC) at a lowermost location in the bore 14. The reciprocation between the top dead center (TDC) position and the bottom dead center (BDC) position within the bore 14 defines the four-stroke cycle of an internal combustion engine 10 including the intake, compression, power, and exhaust.

An oil pan 40 is mounted to the lowermost end 24 of the cylinder block 12 in fluid connection therewith. Lubricating fluid, such as engine oil, is contained within the crankcase 40 and is circulated via an oil pump (not shown) throughout appropriate areas of the internal combustion engine 10.

A cylinder head 42 is mounted at the upper end 16 of the cylinder block 12 in closing relation to the bore 14 adjacent the piston 28. A combustion chamber 43 is formed within the bore 14 between the cylinder head 42 and the piston 28. A valve cover 44 is mounted at an upper end 46 of the cylinder head 42. A breather assembly 48 is mounted at an upper end 52 of the valve cover 44.

An intake port 54 is formed within the cylinder head 42 and is in fluid communication with the combustion chamber 43. An intake valve 62 is disposed within the cylinder head 42 and has an open and a closed position. Although a poppet type valve is shown, it should be understood that any suitable type of valve, such as a sleeve valve, slide valve, or rotary valve. The intake valve 62 is operatively associated with the intake port 54 to admit ambient air into the combustion chamber 43 during the intake stroke of the engine 10 when the intake valve 62 is in the open position. The intake valve 62 is selectively moved to the open and closed positions by any suitable actuation means, such as by a camshaft assembly 68 or similar mechanical means, hydraulic means, pneumatic means, or electric means.

A means 70 for fluidly connecting the crankcase 24 with the breather assembly 48 is provided within the internal combustion engine 10. The connecting means 70 includes a cavity 78 disposed within the upper end 16 of the cylinder block 12, a passage 80 extending from the cavity 78 and terminating within the lower end 24 of the cylinder block, an annular bore 84 disposed within the cylinder head 42 and extending from the cavity 78 and terminating within the valve cover 44, and an opening 90 defined through the outer wall of the valve cover 44.

An air-oil separator 100 is fluidly connected to the breather 48 through an inlet tube 104 and is connected to the crankcase 24 through an outlet tube 108. The air-oil separator 100 is illustrated more specifically in FIGS. 2 and 3. The air-oil separator 100 has an annular housing 112 with an outer wall 114.

A first, induction compartment 120 is located within the annular housing 112. The first compartment 120 has an outer annular chamber 124 and an inner chamber 128. A central annular wall 130 separates the outer chamber 124 from the inner chamber 128. The central wall 130 has a first end portion 134 diverging toward the outer wall 114 to define a first fluid inlet port 138 and a second end portion 140 opposite the first end portion 134 diverging toward the outer wall 114 to define a fluid outlet port 144. The first and second end portions 134,140 of the central wall 130 are associated with a constricted middle portion 146 to form a venturi-shaped design. A second fluid inlet port 150 extends from the outer annular chamber 124 through the outer wall 114 of the housing 112. An inlet passage 154 is connected to the input tube 104 and extends outwardly from the second fluid inlet port 150. A means 156 for introducing blow-by gas to fresh air includes the central wall 130 defining a plurality of openings 160 therethrough extending into the outer chamber 124 allowing fluid communication between the outer chamber 124 and the inner chamber 128. A central flow path 162 is defined through the constricted middle portion 146 between the first fluid inlet port 138 and the fluid outlet port 144.

A second, separation compartment 168 is located within the annular housing 112 adjacent the first compartment 120. A separating means 169 is defined within the second compartment and includes an annular outer gallery 170 defined by an annular wall 174 converging inwardly from the outer wall 114 of the housing 112 toward the fluid outlet port 144. The outer gallery 170 communicates with an outer annular portion 178 of the fluid outlet port 144. An annular opening 180 is defined at a terminating end 182 of the annular wall 174. The annular opening 180 has a diameter substantially equal to the diameter of the central flow path 162. An air flow path 186 is defined from the fluid outlet port 144 through the annular opening 180. An air flow port 190 is defined at the intersection of the outer wall 114 of the housing 112 and the annular wall 174 and diverges outwardly from the air flow path 186. A liquid outlet port 194 extends from the outer gallery 170 through the outer wall 114 of the housing 112. An outlet passage 196 extends outwardly from the liquid outlet port 194.

An adapter 200 is releasably connected to an intake pipe 204 by a clamp 206. The intake pipe 204 is connected to the intake port 54 for communication between the air flow port 190 and the combustion chamber 50. The adapter 200 has an outer wall 210 circumferentially surrounding a substantial portion of the air-oil separator 100. The inlet passage 154 and the outlet passage 196 are secured to the outer wall 210 of the adapter 200 with the passages 154,196 extending through a pair of defined openings 212,214 therein. An air filter 220 of any suitable type is releasably connected to the adapter 200 at a first end 221 by a connection assembly 222. The air filter 220 circumferentially surrounds the outer wall 114 of the housing 112 adjacent a substantial portion of the first compartment 120 at a defined opening 226 therearound. An end cap 230 is fitted against a second end 232 of the air filter 220 opposite the first end 221. The air filter 220 has a bore 242 seated against the outer wall 114 of the housing 112.

The connection assembly 222 includes a plurality of angularly disposed rods 250 connected to the outer wall 210 of the adapter 200. The rods 250 each have a bent first end portion 254 extending through a plurality of slots 256 defined through the outer wall 210. The rods 250 converge centrally at a second end portion 260 into the air filter housing 220. A threaded rod 264 is connected at a first end 268 to the second end portion 260 of the angularly disposed rods 250. The threaded rod 264 extends through the air filter housing 220 and the end cap 230 at a second end 270. A nut 274 is threaded on the second end 270 and is tightened against the end cap 230.

INDUSTRIAL APPLICABILITY

In use on an internal combustion engine 10 and referring more specifically to FIGS. 1–3, blow-by gas within the crankcase 24 is communicated to the air-oil separator 100 due to the low pressure region within the annular housing 112 created by the pressure drop across the air filter 240 and the portion of airflow passing through the constricted middle portion 146. The blow-by gas first travels through the passage 80 and into the cavity 78 surrounding the camshaft assembly 68. Then, the blow-by gas travels through the annular bore 84 into the valve cover 44 where it eventually flows into the breather assembly 48 via the opening 90. The blow-by gas flows through the inlet tube 104 and the inlet passage 154 to enter the outer annular chamber 124 via the second fluid inlet port 150. The blow-by gas enters the constricted middle portion 146 of the first compartment 120 through the plurality the openings 160. Simultaneously, fresh air is drawn through the air filter housing 220 and the air filter 240 at a relatively high velocity due to the vacuum created by the downward displacement of the piston 28 within the cylinder bore 14 during the intake stroke, and if equipped with a turbocharger (not shown), the additional intake air flowrate generated by the compressor portion of the-turbocharger. It should be understood that a conventional turbocharger may be used between the intake pipe 204 and the combustion chamber 43 for increased power. The fresh air is cleaned in a conventional manner as it enters the air filter 240. The "clean" fresh air enters the constricted middle portion 146 via the first fluid inlet port 138.

The blow-by gas enters the constricted middle portion 146 at a relatively low velocity (effectively zero). Fresh air at a relatively high velocity, typically approaching Mach 0.5, flows through the central flow path 162. The blow-by gas is therefore introduced into the boundary layer of the fresh air flow. The majority of the blow-by gas is picked up and accelerated by the fresh air flow due to boundary layer effect, except for any particles therein in contact with the central wall 130. It is important to understand that the blow-by gas will not intermix with the fresh air during this process. The blow-by gas will build velocity and momentum with the fresh air flow and leave the first compartment 120 via the fluid outlet port 144. When the fresh air flow, with the surrounding layer of blow-by gas, reaches the annular opening 180, the opening surface will strip the boundary layer from the fresh air flow causing the blow-by gas to split off into the annular outer gallery 170 at a high velocity. The fresh air flow continues through the air flow port 190 toward the combustion chamber 43 via the intake pipe 204 for combustion therein.

The blow-by gas which contains the oil particles to be separated enters the outer annular gallery 170 of the second compartment 168 through the outer annular portion 178 of the fluid outlet port 144. The shape of the annular wall 174, with a surface curving away from the fresh air flow path, promotes a centrifugal action within the outer annular gallery 170. The heavier oil particles with greater momentum are forced to the outside of the outer annular gallery 170 where they collide with and collect on the wall surface. The oil, now removed from the blow-by gas, drains from the gallery 170 into the oil pan 40 via the liquid outlet port, outlet passage, and crankcase 24. The remaining air from the blow-by gas is carried with the fresh air flow toward the combustion chamber 43.

The action of tightening the nut 274 on the threaded rod 264 creates a pull on the rods 250 which hold the air filter 220 in place. Tension on the connection assembly 222 provides a compressive force on the second end of the air filter 220 between the end cap 230 and the adapter 200. The air filter 240 may be easily inspected, cleaned, or replaced by simply removing the nut 274 and the end cap 230.

In view of the above, it is apparent that the present invention provides an improved and simple means to separate oil and air from blow-by gas. The present invention utilizes the introduction of blow-by gas from a crankcase to high velocity fresh air at its boundary layer. The blow-by gas is accelerated along with the fresh air flow. Oil particles from the blow-by gas are centrifugally separated by the unique design of a second chamber so that the remaining air within the blow-by gas and fresh air may continue toward the combustion chamber. Boundary layer fluid flow and centrifugal separation are utilized in this simple and efficient method of air-oil separation.

We claim:

1. An air-oil separator, comprising:

a housing having an outer wall;

a first compartment located within the housing, the first compartment having an outer annular chamber, an inner chamber in communication with the outer chamber, an apertured central annular wall separating the outer chamber from the inner chamber with the central wall having a first end portion diverging toward the outer wall to define a first fluid inlet port adapted to admit fresh air into the inner chamber, and second fluid inlet port extending from the outer chamber through the outer wall of the housing adapted to admit blow-by gas into the outer chamber so that blow-by gas is allowed to flow through the apertured central wall an into the inner chamber for introduction to the fresh air;

the central wall having a second end portion opposite the first end portion and diverging toward the outer wall to define a fluid outlet port adapted to allow the fresh air and blow-by gas to exit the first compartment; and a second compartment located within the housing adjacent the first compartment, the second compartment adapted to separate oil from the blow-by gas within the fresh air as the blow-by gas and fresh air pass therethrough.

2. The air-oil separator of claim 1, wherein the second compartment has an outer annular gallery defined by an annular wall converging inwardly from the outer wall of the housing toward the fluid outlet port to define an annular opening therethrough and a liquid outlet port extending from the outer gallery through the outer wall of the housing.

3. The air-oil separator of claim 2, wherein the central wall defines a plurality of openings therethrough extending into the outer chamber.

4. The air-oil separator of claim 3, including an adapter having an outer wall with the second fluid inlet port and the liquid outlet port extending therethrough and an air filter releasably connected to the outer wall of the adapter adjacent the outer wall of the housing, an end portion of the air filter defining an opening circumferentially surrounding the first end portion of the first compartment.

5. The air-oil separator of claim 4, including a plurality of angularly disposed rods connected to the outer wall of the adapter converging centrally into the air filter, an end cap fitted against the air filter, a threaded rod attached to the plurality of angularly disposed rods at a first end and extending through the air filter and the end cap, and a nut threaded on the threaded rod on a second end opposite the first end adjacent the end cap.

6. An internal combustion engine having a cylinder block defining a crankcase portion with blow-by gas therein, a piston reciprocally disposed within a bore in the cylinder block, a cylinder head in closing relation with the bore in the cylinder block and forming with the piston a variable volume combustion chamber, a passage defined within the crankcase portion in communication with the combustion chamber, an air-oil separator disposed between the crankcase portion and the combustion chamber, comprising:

a housing having an outer wall;

a source of high velocity fresh air;

a first compartment located within the housing, the first compartment having an outer annular chamber, an inner chamber in communication with the outer chamber, a central annular wall separating the outer chamber from the inner chamber with the central wall having a first end portion diverging toward the outer wall to define a first fluid inlet port for receiving fresh air and a second end portion opposite the first end portion diverging toward the outer wall to define a fluid outlet port, a second fluid inlet port for receiving blow-by gas extending from the outer chamber through the outer wall of the housing, and a central flow path defined between the first fluid inlet port and the fluid outlet port;

a second compartment adjacent the first compartment and in communication with the central flow path;

means disposed within the first compartment for introducing the blow-by gas to the fresh air; and means disposed within the second compartment for separating liquid from the blow-by gas.

7. The internal combustion engine of claim 6, wherein the separating means includes an outer annular gallery and a liquid outlet port extending from the outer gallery through the outer wall of the housing, the outer gallery being defined by an annular wall converging inwardly from the outer wall of the housing toward the fluid outlet port and communicating with an outer annular portion of the fluid outlet port to define an annular opening therethrough.

8. The internal combustion engine of claim 7, wherein the separating means includes an air flow path defined from the fluid outlet port through the annular opening and extending into the combustion chamber.

9. The internal combustion engine of claim 8, wherein the introducing means includes the central wall defining a plurality of openings therethrough extending into the inner chamber.

10. The internal combustion engine of claim 9, including an adapter having an outer wall with the second fluid inlet port and the liquid outlet port extending therethrough and an air filter releasably connected to the outer wall of the adapter adjacent the outer wall of the housing, an end portion of the air filter defining an opening circumferentially surrounding the first end portion of the first compartment.

11. The internal combustion engine of claim 10, including a plurality of angularly disposed rods connected to the outer wall of the adapter converging centrally into the air filter, an end cap fitted against the air filter, a threaded rod attached to the plurality of angularly disposed rods at a first end and extending through the air filter and the end cap, and a nut threaded on the threaded rod on a second end opposite the first end adjacent the end cap.

12. The internal combustion engine of claim 9, wherein the introducing means includes the fresh air having a sufficient velocity so that the blow-by gas is carried on the boundary layer of the fresh air within the central flow path.

\* \* \* \* \*